United States Patent
Osterhouse et al.

(10) Patent No.: US 11,719,354 B2
(45) Date of Patent: Aug. 8, 2023

(54) FREELY CLOCKING CHECK VALVE

(71) Applicant: Hypertherm, Inc., Hanover, NH (US)

(72) Inventors: David Osterhouse, New Brighton, MN (US); Nathan Quinn, Golden Valley, MN (US)

(73) Assignee: Hypertherm, Inc., Hanover, NH (US)

(*) Notice: Subject to any disclaimer, the term of this patent is extended or adjusted under 35 U.S.C. 154(b) by 140 days.

(21) Appl. No.: 17/213,043

(22) Filed: Mar. 25, 2021

(65) Prior Publication Data
US 2021/0301936 A1 Sep. 30, 2021

Related U.S. Application Data

(60) Provisional application No. 63/000,268, filed on Mar. 26, 2020.

(51) Int. Cl.
| | | |
|---|---|---|
| *F16K 17/168* | (2006.01) | |
| *F16K 17/04* | (2006.01) | |
| *F16K 17/06* | (2006.01) | |

(52) U.S. Cl.
CPC ............ *F16K 17/168* (2013.01); *F16K 17/04* (2013.01); *F16K 17/0466* (2013.01); *F16K 17/065* (2013.01)

(58) Field of Classification Search
CPC .... F16K 17/04; F16K 17/168; F16K 17/0466; F16K 17/065
See application file for complete search history.

(56) References Cited

U.S. PATENT DOCUMENTS

| | | |
|---|---|---|
| 1,847,147 A | 4/1930 | Thomas, Jr. |
| 2,528,280 A | 10/1950 | Lyon |
| 2,715,958 A | 8/1955 | Lindstrom et al. |
| 2,788,994 A | 4/1957 | Van De Wateren |

(Continued)

FOREIGN PATENT DOCUMENTS

| | | |
|---|---|---|
| DE | 202013104815.1 U1 | 2/2014 |
| EP | 0391489 A1 | 10/1990 |

(Continued)

OTHER PUBLICATIONS

Definition of "along" retrieved from dictionary.cambridge.org/us/dictionary/english/along (retrieved on Oct. 31, 2022). (Year: 2022).*

(Continued)

*Primary Examiner* — Jessica Cahill
(74) *Attorney, Agent, or Firm* — Perkins Coie LLP

(57) ABSTRACT

A check valve assembly for use with a liquid jet cutting system can include a check valve body a high-pressure fluid inlet on one end and a high-pressure fluid outlet on the other end along a central axis of the check valve body. The check valve body can have a first metallic seal surface on an outer surface of the check valve shaped to engage an endcap of the liquid jet cutting system to form a first seal. The assembly can include an annular low-pressure fluid chamber surrounding a portion of the check valve body and defined at least in part by an annular gasket, the check valve body, the first seal, and the endcap. The check valve body can include a low-pressure fluid channel, and a check valve positioned between the low-pressure fluid channel and a high-pressure fluid chamber.

40 Claims, 6 Drawing Sheets

(56) References Cited

U.S. PATENT DOCUMENTS

| | | |
|---|---|---|
| 2,999,552 A | 9/1961 | Fox |
| 3,232,638 A | 2/1966 | Bernard |
| 3,267,718 A | 8/1966 | Grube |
| 3,454,288 A | 7/1969 | Mancusi |
| 3,517,701 A | 6/1970 | Smith |
| 3,711,633 A | 1/1973 | Ghirardi et al. |
| 3,756,106 A | 9/1973 | Chadwick et al. |
| 3,834,912 A | 9/1974 | Grudzinski |
| 4,026,322 A | 5/1977 | Thomas |
| 4,089,199 A | 5/1978 | Siemonsen |
| 4,134,430 A | 1/1979 | Mukasa et al. |
| 4,162,763 A | 7/1979 | Higgins |
| 4,195,669 A | 4/1980 | Ives et al. |
| 4,246,838 A | 1/1981 | Pulver et al. |
| 4,261,769 A | 4/1981 | Usui |
| 4,339,897 A | 7/1982 | Thompson et al. |
| 4,371,001 A | 2/1983 | Olsen |
| 4,594,924 A | 6/1986 | Windisch |
| 4,823,550 A | 4/1989 | Decker |
| 4,878,320 A | 11/1989 | Woodson |
| 4,893,753 A | 1/1990 | Munoz et al. |
| 4,903,388 A | 2/1990 | Skonvall |
| 4,973,026 A | 11/1990 | Saurwein |
| 5,018,670 A | 5/1991 | Chalmers |
| 5,037,276 A * | 8/1991 | Tremoulet, Jr. ...... F04B 53/103 417/470 |
| 5,037,277 A * | 8/1991 | Tan ............... F16K 17/0433 137/540 |
| 5,120,084 A | 12/1992 | Hashimoto |
| 5,172,939 A | 12/1992 | Hashimoto |
| 5,186,393 A | 2/1993 | Yie |
| 5,209,406 A | 5/1993 | Johnson |
| 5,255,853 A | 10/1993 | Munoz |
| 5,320,289 A | 6/1994 | Hashish et al. |
| 5,352,254 A | 10/1994 | Celikkaya |
| 5,468,066 A | 11/1995 | Hammonds |
| 5,564,469 A | 10/1996 | Tremoulet, Jr. et al. |
| 5,636,789 A | 6/1997 | Shook |
| 5,643,058 A | 7/1997 | Erichsen et al. |
| 5,730,358 A | 3/1998 | Raghavan et al. |
| 5,771,873 A | 6/1998 | Potter et al. |
| 5,794,858 A | 8/1998 | Munoz |
| 5,799,688 A | 9/1998 | Yie |
| 5,837,921 A | 11/1998 | Rinaldi et al. |
| 5,924,853 A | 7/1999 | Pacht |
| 5,948,332 A | 9/1999 | Prenger |
| 5,970,996 A | 10/1999 | Markey et al. |
| 5,979,945 A | 11/1999 | Hitachi et al. |
| 5,992,904 A | 11/1999 | Hitachi et al. |
| 6,077,152 A | 6/2000 | Warehime |
| 6,098,677 A | 8/2000 | Wegman et al. |
| 6,126,524 A | 10/2000 | Shepherd |
| 6,136,386 A | 10/2000 | Nakahigashi et al. |
| 6,155,092 A | 12/2000 | Sahlem |
| 6,155,245 A | 12/2000 | Zanzuri |
| 6,162,031 A | 12/2000 | Tremoulet |
| 6,213,095 B1 | 4/2001 | Asada et al. |
| 6,227,768 B1 | 5/2001 | Higuchi et al. |
| 6,280,302 B1 | 8/2001 | Hashish et al. |
| 6,379,214 B1 | 4/2002 | Stewart et al. |
| 6,408,826 B2 | 6/2002 | Asada et al. |
| 6,450,546 B1 | 9/2002 | Montgomery et al. |
| 6,497,219 B2 | 12/2002 | Natsume |
| 6,540,586 B2 | 4/2003 | Sciulli |
| 6,544,012 B1 | 4/2003 | Blume |
| 6,548,173 B2 | 4/2003 | Erdemir et al. |
| 6,619,570 B1 | 9/2003 | Ericksen et al. |
| 6,705,921 B1 | 3/2004 | Shepherd |
| 6,802,541 B2 | 10/2004 | Hopinks et al. |
| 6,860,517 B2 | 3/2005 | Sanders |
| 6,959,908 B2 | 11/2005 | Isbitsky |
| 7,033,256 B2 | 4/2006 | Miller |
| 7,094,135 B2 | 8/2006 | Chisum et al. |
| 7,207,868 B2 | 4/2007 | Takehara et al. |
| 7,247,006 B2 | 7/2007 | Hopkins et al. |
| 7,367,789 B2 * | 5/2008 | Raghavan ............ F04B 53/007 417/571 |
| 7,465,215 B2 | 12/2008 | Shimizu et al. |
| 7,544,112 B1 | 6/2009 | Miller et al. |
| 7,703,363 B2 | 4/2010 | Knaupp et al. |
| 8,277,206 B2 | 10/2012 | Raghavan et al. |
| 8,308,525 B2 | 11/2012 | Hashish et al. |
| 8,342,912 B2 | 1/2013 | Funatsu |
| 8,475,230 B2 | 7/2013 | Summers et al. |
| 9,050,704 B1 | 6/2015 | Liu et al. |
| 9,090,808 B1 | 7/2015 | Liu et al. |
| 9,095,955 B2 | 8/2015 | Raghavan et al. |
| 9,108,297 B2 | 8/2015 | Schubert et al. |
| 9,163,617 B2 * | 10/2015 | Mann ...................... F04B 53/02 |
| 9,272,437 B2 | 3/2016 | Hashish et al. |
| 9,309,873 B2 * | 4/2016 | Roll ....................... F04B 19/22 |
| 9,574,684 B1 | 2/2017 | Fonte |
| 9,638,357 B1 | 5/2017 | Raghavan et al. |
| 9,884,406 B2 | 2/2018 | Hashish et al. |
| 10,010,999 B2 | 7/2018 | Raghavan et al. |
| 10,900,501 B2 | 1/2021 | Trieb |
| 2002/0056347 A1 | 5/2002 | Signey et al. |
| 2003/0067168 A1 | 4/2003 | Sches et al. |
| 2003/0122376 A1 * | 7/2003 | Hopkins ................. F04B 53/16 285/334.4 |
| 2003/0141617 A1 | 7/2003 | Prevotat et al. |
| 2003/0148709 A1 | 8/2003 | Anand et al. |
| 2004/0108000 A1 | 6/2004 | Raghavan et al. |
| 2004/0198179 A1 | 10/2004 | Gadd |
| 2005/0017091 A1 | 1/2005 | Olsen et al. |
| 2005/0252352 A1 | 11/2005 | Tateiwa |
| 2007/0186604 A1 | 8/2007 | Koppensteiner |
| 2007/0252340 A1 | 11/2007 | Reinhard et al. |
| 2008/0019851 A1 * | 1/2008 | Hopkins ............... F04B 53/162 417/415 |
| 2008/0110229 A1 | 5/2008 | Badlani et al. |
| 2009/0139595 A1 | 6/2009 | Kato et al. |
| 2009/0151701 A1 | 6/2009 | Kato et al. |
| 2010/0199740 A1 | 8/2010 | Muschalik et al. |
| 2011/0084476 A1 | 4/2011 | Nishida |
| 2011/0232355 A1 | 9/2011 | Evans et al. |
| 2011/0297269 A1 | 12/2011 | Pilon et al. |
| 2012/0021676 A1 | 1/2012 | Schubert et al. |
| 2012/0091382 A1 | 4/2012 | Yie |
| 2012/0196516 A1 | 8/2012 | Funatsu et al. |
| 2012/0217011 A1 | 8/2012 | Dotson et al. |
| 2012/0238188 A1 | 9/2012 | Miller |
| 2012/0247296 A1 | 10/2012 | Stang et al. |
| 2012/0252325 A1 | 10/2012 | Schubert et al. |
| 2012/0252326 A1 | 10/2012 | Schubert et al. |
| 2013/0005225 A1 | 1/2013 | Russo |
| 2013/0167697 A1 | 7/2013 | Reukers |
| 2014/0015202 A1 * | 1/2014 | Chacko ................. F04B 1/0448 277/500 |
| 2014/0015245 A1 | 1/2014 | Chiu |
| 2014/0124184 A1 | 5/2014 | Tokura |
| 2014/0377485 A1 | 12/2014 | Berger et al. |
| 2015/0053075 A1 | 2/2015 | Rabhi |
| 2015/0082606 A1 | 3/2015 | Nakajima et al. |
| 2016/0298614 A1 * | 10/2016 | Gaillard ................. F04B 9/113 |

FOREIGN PATENT DOCUMENTS

| | | |
|---|---|---|
| WO | 2011042244 A2 | 4/2011 |
| WO | 2013109474 A1 | 7/2013 |

OTHER PUBLICATIONS

Hu et al., Computer Modeling and Optimization of Swage Autofrettage Process of a Thick-Walled Cylinder Incorporating Bauschinger Effect, Jan. 14, 2014, American Transactions on Engineering & Applied Sciences, vol. 3, pp. 31-63.

American Rifleman, Ruger New Model Single-Six .17 HMR, Sep. 2003, pp. 90-96, Year: 2003.

His Esdu, "Guide to Stress Concentration Data," The Royal Aeronautical Society—The Institution of Mechanical Engineers, 64001 Issued Jun. 1976.

(56) References Cited

OTHER PUBLICATIONS

Hydraulics & Pneumatics—Serving Fluid Power and Motion Control Engines Worldwide, http://www.hydraulicspneumatics.com/200/TechZone/FittingsCouplin/Article/True/6421/, 2010, 2 pages.

Pilkey, Walter D., "Peterson's Stress Concentration Factors," Second Edition, John Wiley & Sons, Inc., Copyright 1997, pp. 175-185, 204-207, 211-216, 256-257, 284, 287-301,318-322, 326, 362, 370.

Stephens, Ralph, et al., "Metal Fatigue in Engineering," Second Edition, John Wiley & Sons, Inc., Copyright 2001, Chapter 7, pp. 186-193.

Stress Concentration—Wikipedia, http://wikipedia.org/wiki/Stress_concentration, accessed Oct. 5, 2011, 3 pages.

Timoshenko, S. P., et al., "Theory of Elasticity," Third Edition, McGraw Hill Book Company, Copyright 1934, pp. 90-97, 181-194, 209-217.

Genuine Flow Parts—87K High-pressure Cylinder, copyright 2021 Flow International Corporation, A Shape Technologies Company, https://flowparts.com/collections/high-pressure-components/products/cylinder-hp-cartridge-87k-2-0-intn [last accessed Mar. 29, 2021], 4 pages.

Waterjet cutting head parts, 60k high pressure HP Cylinder body for Jet Edge / sunrise water jet head intensifier pump SR20004, copyright 2010-2020 AliExpress.com, https://www.aliexpress.com/item/33039960455.html [last accessed Mar. 29, 2021], 5 pages.

\* cited by examiner

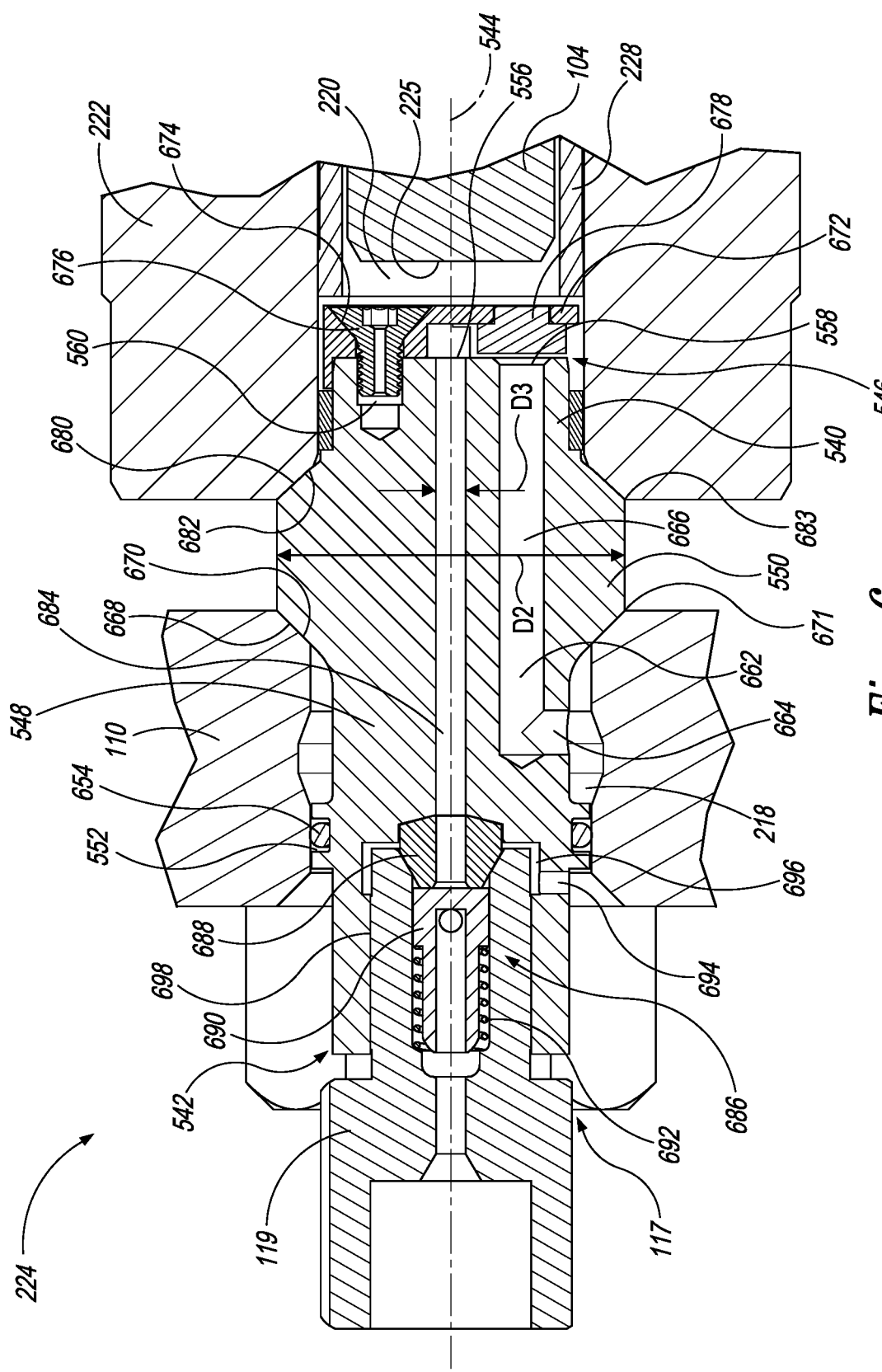

FREELY CLOCKING CHECK VALVE

CROSS-REFERENCE TO RELATED APPLICATIONS INCORPORATED BY REFERENCE

The present application claims priority to U.S. Provisional App. No. 63/000,268, titled FREELY CLOCKING CHECK VALVE, which was filed on Mar. 26, 2020, and is incorporated herein by reference in its entirety.

TECHNICAL FIELD

The present disclosure is generally related to check valves for liquid jet cutting systems.

BACKGROUND

Liquid jet cutting systems (e.g., waterjet cutting systems) typically include a check valve assembly that controls liquid flow into and out from a pressurization cylinder in a pump. During operation, low-pressure water is presented to the check valve body, and high-pressure water is output from the check valve body after pressurization. Many conventional check valve designs include features that can lead to difficult and/or improper installation, premature failure of the check valve assembly, and/or other adverse effects.

BRIEF DESCRIPTION OF THE DRAWINGS

FIG. 6 is an enlarged, side cross-sectional view of a check valve assembly of the liquid pressurization assembly of FIG. 2, configured in accordance with embodiments of the present technology.

DETAILED DESCRIPTION

The following disclosure describes various embodiments of a check valve assembly of a liquid jet cutting system (e.g., a water jet cutting system). The check valve assembly can include a check valve body having a high-pressure channel and a low-pressure channel. In some embodiments, the outlet of the high-pressure channel lies on a longitudinal axis of the check valve body. The check valve assembly can include a low-pressure liquid chamber surrounding a portion of the check valve body. The boundaries of the low-pressure liquid chamber can be defined by an interior wall of an endcap, an exterior wall of the check valve body, a mechanical gasket, and/or a metal-to-metal seal between the endcap and the check valve body.

In the Figures, identical reference numbers identify identical, or at least generally similar, elements. To facilitate the discussion of any particular element, the most significant digit or digits of any reference number refers to the Figure in which that element is first introduced. For example, the cylinder 222 is first introduced and discussed with reference to FIG. 2.

Figure 1:
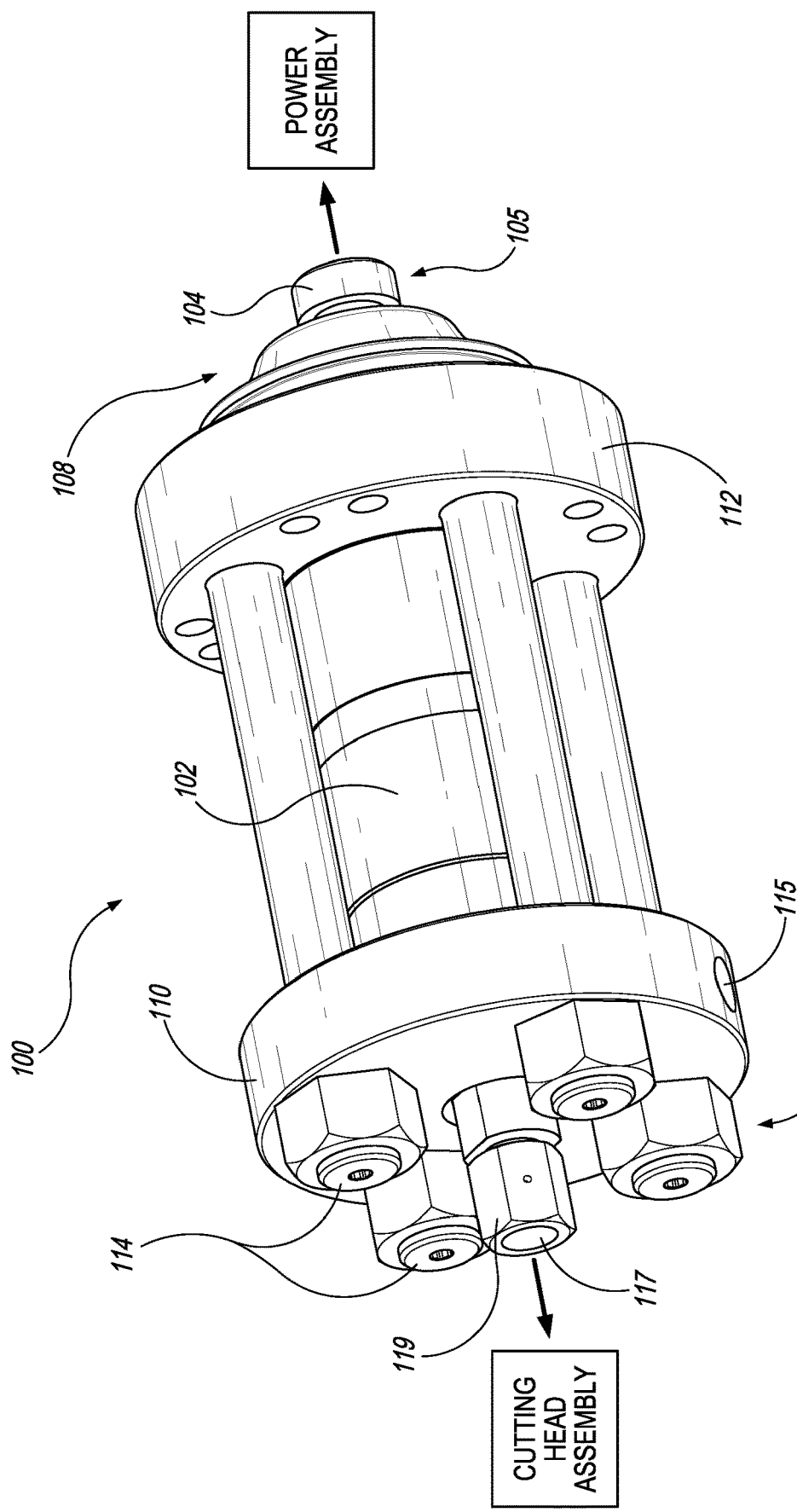
FIG. 1 is an isometric view of a liquid pressurization assembly configured in accordance with embodiments of the present technology.

FIG. 1 is an isometric view of a liquid pressurization assembly 100 configured in accordance with embodiments of the present technology. The liquid pressurization assembly 100 can include a cylinder assembly 102. The cylinder assembly 102 can be configured to receive at least a portion of a plunger 104 configured to reciprocate within the cylinder assembly 102 and pressurize liquid for output to a liquid jet cutting head assembly (not shown) via an inlet/outlet end portion 106. The plunger 104 can be reciprocated by a power assembly (not shown) operably coupled to a dynamic end portion 108 of the liquid pressurization assembly 100. In some embodiments, the power assembly can include components of a linear intensifier pump, e.g., a piston operably contained within a hydraulic cylinder that is fixedly attached to the pressurization assembly 100 in a conventional manner. In other embodiments, the power assembly can include components of a rotary direct drive pump, e.g., a crankshaft and associated connecting rod contained within a crankcase fixedly attached to the pressurization assembly 100 in a conventional manner. In such embodiments, the power assembly applies reciprocating forces to a proximal end portion 105 of the plunger 104 which, in some embodiments, extends outside of the liquid pressurization assembly 100. The cylinder assembly 102 can be captured between two endcaps or other retaining structures; one endcap 110 positioned at or near the inlet/outlet end portion 106, and the other endcap 112 positioned at or near the dynamic end portion 108. The endcaps 110, 112 can be fixedly connected to each other via one or more bolts 114 or other fasteners or connection means. In operation, the liquid jet pressurization assembly can be configured to receive low-pressure liquid via an inlet 115, pressurize the low-pressure liquid, and output high-pressure liquid to the liquid jet assembly via an outlet 117 and/or an outlet fitting 119.

Figure 2:
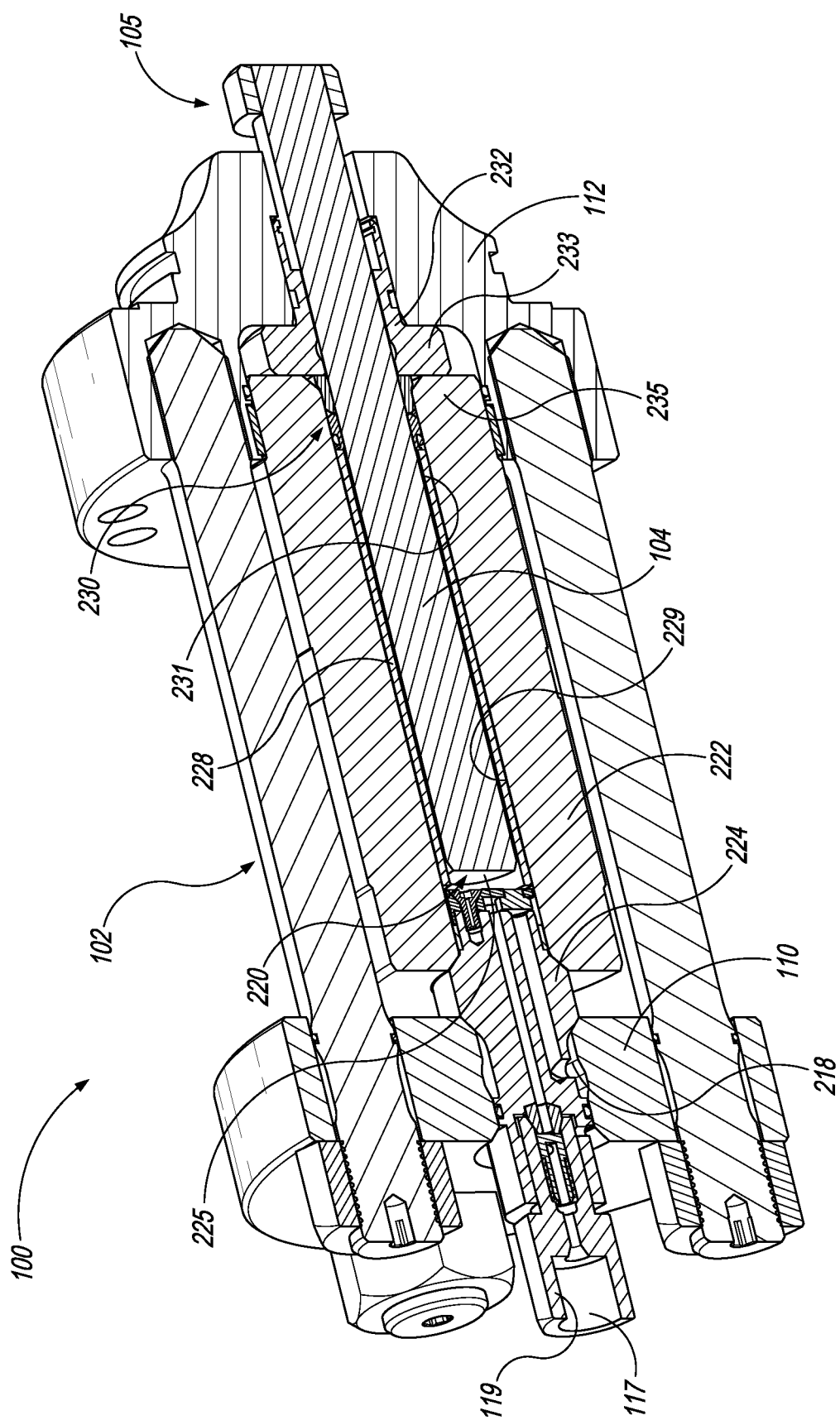
FIG. 2 is an isometric, side cross-sectional view of the liquid pressurization assembly of FIG. 1, illustrating a check valve assembly configured in accordance with embodiments of the present technology.

FIG. 2 is an isometric, side cross-sectional view of the liquid pressurization assembly 100 of FIG. 1 illustrating a check valve assembly 224 configured in accordance with embodiments of the present technology. The cylinder assembly 102 can include spacer ring 228 (e.g., a cylindrical sleeve) surrounding at least a portion of the plunger 104 as the plunger 104 reciprocates within the cylinder 222. The spacer ring 228 can be configured to space components from each other (e.g., space components of the below-described seal assembly 230 from the plunger) and/or to displace liquid between the seal assembly 230 and the check valve assembly 224 within the cylinder 222. The cylinder assembly 102 can also include a seal assembly 230 operably positioned proximate the dynamic end portion 108 and opposite the check valve assembly 224. The seal assembly 230 can be configured to reduce or eliminate leakage of high-pressure fluid through the space between the inner sidewall 229 of the cylinder 222 and the outer sidewall 231 of the plunger 104. In some embodiments, the seal assembly 230 is positioned at least partially within the space between the plunger 104 and the cylinder 222, in a portion of the cylinder 222 between a proximal end portion of the spacer ring 228 and the endcap 112 on the dynamic end portion 108. The seal assembly 230 can be configured to operate in a high-pressure environment (e.g., at pressures over 40,000 psi and reaching up to 120,000 psi, at pressures between 20,000 and 100,000 psi, between 20,000 and 80,000 psi, and/or other pressures). The liquid pressurization assembly 100 can also include a collar 232 (e.g., a seal carrier or seal housing) inside of the endcap 112 on the dynamic end portion 108. At least a portion of the collar 232 (e.g., an annular flange portion 233) can be compressed between a proximal end portion 235 of the cylinder 222 and the endcap 112. In some embodiments, the collar 232 can form a seal between the plunger 104 and the endcap 112 and can abut the seal assembly 230. For example, the collar 232 can carry one or more O-rings, gaskets, or other elastomeric, flexible, and/or resilient structures configured to form a seal between the endcap 112 and the plunger 104.

The liquid pressurization assembly 100 can include a low-pressure liquid chamber 218 configured to receive low-pressure liquid (e.g., water) from a liquid source (not shown in FIG. 2) via the inlet 115 (FIG. 1). In operation, liquid from the low-pressure liquid chamber 218 is drawn into a high-pressure liquid chamber 220 within the cylinder 222 via movement of the plunger 104 away from the inlet/outlet end portion 106. For example, as described in greater detail below, in operation the low-pressure liquid can be drawn through the check valve assembly 224 into the high-pressure liquid chamber 220 between the check valve assembly 224 and a distal end 225 of the plunger 104. Reciprocation of the plunger 104 back toward the inlet/outlet end portion 106 then compresses the liquid within the high-pressure liquid chamber 220 and drives the high-pressure liquid outwardly through the check valve assembly 224 and onward to the liquid jet cutting head assembly via the outlet 117.

Figure 3:
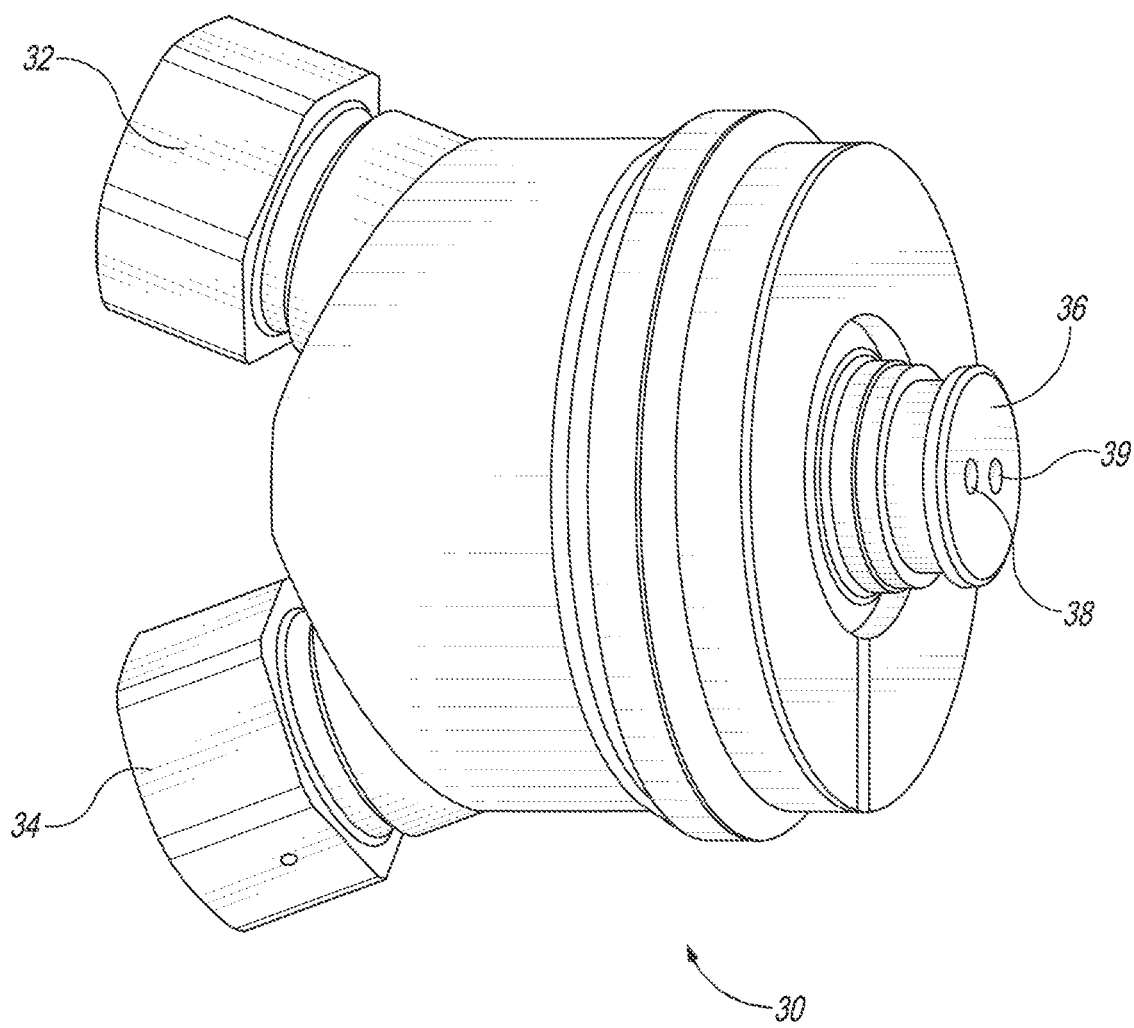
FIG. 3 is an isometric view of a conventional check valve body.

Many conventional liquid jet pressurization assemblies use one of two approaches to supply low-pressure liquid to the high-pressure fluid chamber and to direct high-pressure liquid to a cutting head assembly. One common approach is illustrated by the check valve body 30 of FIG. 3. This type of check valve body 30 receives low pressure water directly via an inlet water fitting 32 positioned on the same end of the check valve body 30 as an outlet water fitting 34. The check valve body 30 includes a cylinder interface 36 positioned on the opposite end of the check valve body 30 that has an inlet channel opening 38 (e.g., an opening in fluid communication with the inlet water fitting 32) and an outlet channel opening 39 (e.g., an opening in fluid communication with the outlet water fitting 34). Because of the off-center positioning of, e.g., the inlet water fitting 32 and the outlet water fitting 34, the check valve body 30 must be appropriately clocked (e.g., rotationally-aligned about the longitudinal axis of the check valve body 30 with respect to the mating cylinder assembly (not shown)) on installation to ensure that inlet water fitting 32 is properly aligned with the corresponding fitting on the inlet water path and the outlet water fitting 34 is properly aligned with the corresponding fitting on the outlet water path. This clocking/alignment process is time consuming and can be done incorrectly, leading to premature failure of the check valve body 30 and/or insufficient liquid supply to the cutting head assembly.

Figure 4A:
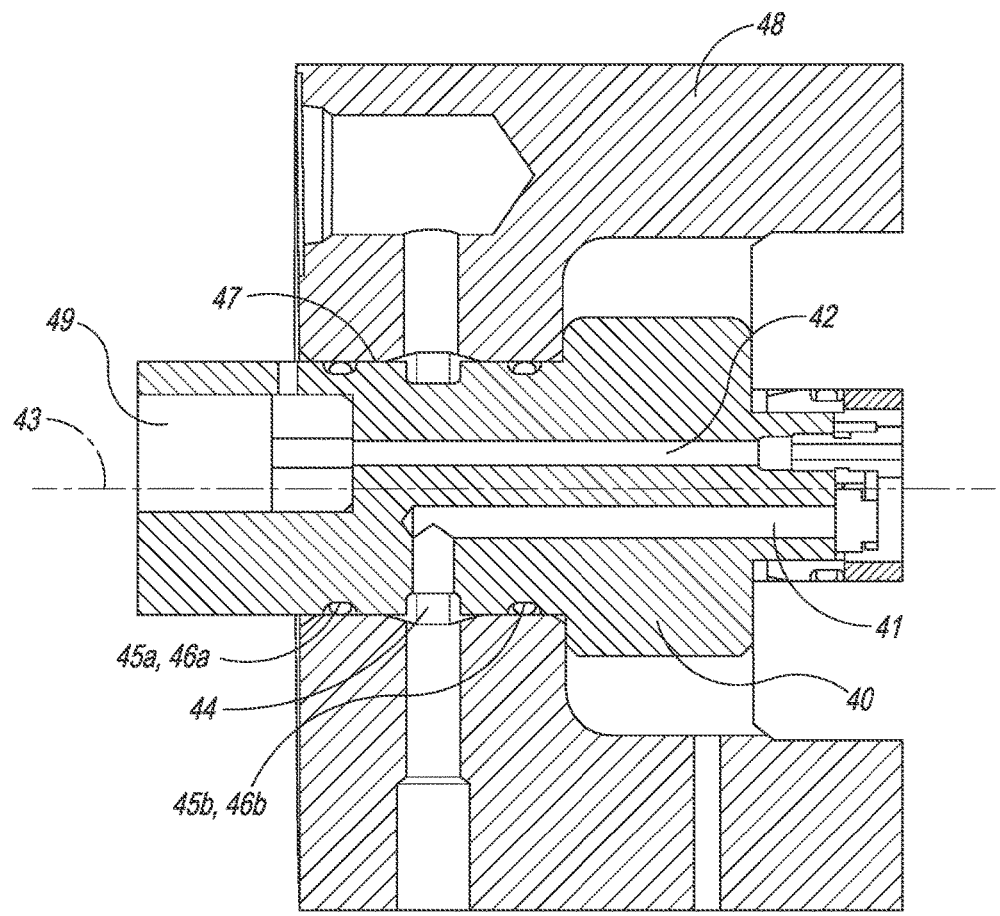
FIG. 4A is a side cross-sectional view of another conventional check valve assembly.
Figure 4B:
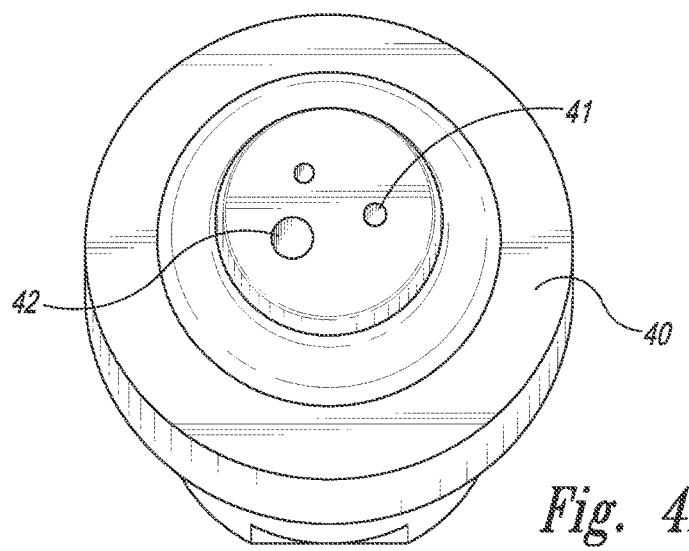
FIG. 4B is an isometric view of a body of the check valve assembly of FIG. 4A.

FIGS. 4A and 4B illustrate another conventional check valve body 40. Like the check valve body 30 of FIG. 3, the check valve body 40 of FIG. 4 includes a low-pressure channel 41 and a high-pressure channel 42 that are not aligned with the central, longitudinal axis 43 of the check valve body 40. That is, both the low- and high-pressure channels 41 and 42, respectively, are offset relative to the longitudinal axis 43. The high-pressure channel 42 extends to an outlet port 49 configured to connect to an outlet fitting (not shown). The check valve body 40 includes an annular low-pressure fluid chamber 44 that is sealed by first and second O-rings 45a, 45b in separate O-ring channels 46a, 46b in an outer wall 47 of the check valve body 40. The O-rings 45a, 45b seal against an endcap 48 surrounding the check valve body 40. Not only does the design illustrated in FIGS. 4A and 4B require clocking the check valve body (e.g., in order to align the outlet port 49 with an outlet fitting of the liquid jet cutting system), but also the use of two O-rings to seal the low-pressure fluid chamber adds to the number of parts in the system and the complexity of the check valve body 40.

Figure 5A:
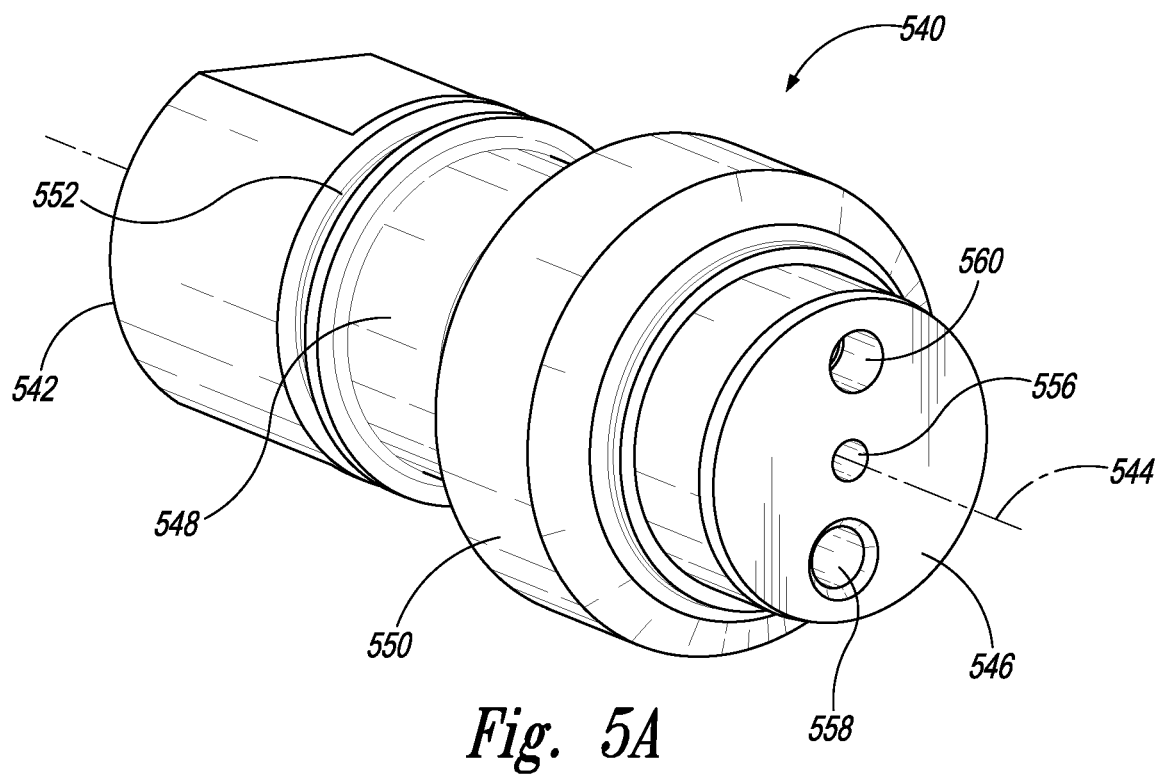
FIG. 5A is an isometric end view of a body of the check valve assembly of FIG. 2, configured in accordance with embodiments of the present technology.

FIG. 5A is an isometric view of a check valve body 540 of the check valve assembly 224 of FIG. 2, configured in accordance with embodiments of the present technology. The check valve body 540 includes a first end portion 542, a longitudinal axis 544 (e.g., a central axis), and a second end portion 546 opposite the first end portion 542 along the longitudinal axis 544. The check valve body 540 can include an elongate body portion 548 extending between the first and second end portions, 542, 546, respectively. A flange 550 can extend radially outward from the elongate body portion 548, and can be positioned near the second end portion 546 of the check valve body 540. For example, the flange 550 can be positioned approximately ¼ of the length of the check valve body 540 from the second end portion 546 of the check valve body 540. In some embodiments, the flange 550 is positioned between 1/10 and ½, between ⅕ and ⅖, and/or between 3/16 and 5/16 of the length of the check valve body 540 from the second end portion 546. In other embodiments, the flange 550 can have other positions. The flange 550 can function as a load-bearing portion of the check valve body 540 (e.g., an annular load-bearing portion) configured to react compressive force from other components of the liquid pressurization system 100, as explained in further detail below. The check valve body 540 can be constructed from a metallic, ceramic, and/or polymer material or combination of materials. For example, the check valve body 540 may be constructed from a stainless steel material.

The check valve body 540 can include an outer groove or channel 552 configured to receive a gasket 654 (e.g., an O-ring; FIG. 6) or other type of seal. The outer channel 552 can be positioned approximately ⅓ of the length of the check valve body 540 from the first end portion 542 of the check valve body 540. In some embodiments, the outer channel 552 is positioned between 1/10 and ½, between ⅕ and ⅖, and/or between 2/9 and 4/9 of the length of the check valve body 540 from the first end portion 542.

With continued reference to FIG. 5A, the second end portion 546 of the check valve body 540 includes a high-pressure inlet 556 positioned (e.g., coaxially positioned) along the longitudinal axis 544. The second end portion 542 can also include a low-pressure outlet 558 and a fastener hole 560 configured (e.g., threaded) to receive a screw or other fastener. The fastener hole 560 can be spaced apart from any fluid passages of the check valve body 540.

Figure 5B:
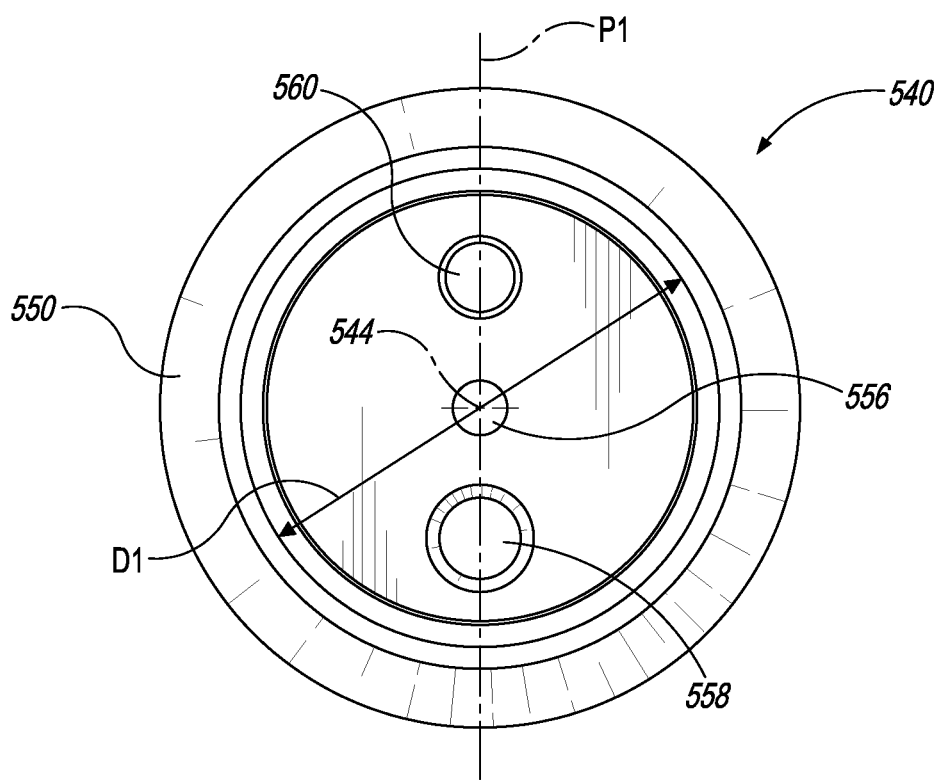
FIG. 5B is a front end view of the check valve body of FIG. 5A.

Turning to FIG. 5B, which is a front view of the check valve body 540, the fastener hole 560, high-pressure inlet 556, and/or the low-pressure outlet 558 each lie in a plane P1 on which the longitudinal axis 544 lies. In some embodiments, the fastener hole 560 and the low-pressure outlet 558 can each be spaced approximately the same distance from and/or on opposite sides of the high-pressure inlet 556, as measured perpendicular to the longitudinal axis 544 of the check valve body 540. For example, the fastener hole 560 and the low-pressure outlet 558 can be spaced between 0.1 and 0.5 inch, between 0.2 and 0.4 inch, and/or between 0.25 and 0.35 inch from the high-pressure inlet 556. In some embodiments, the fastener hole 560 and the low-pressure outlet 558 are spaced approximately 0.3 inch from the high-pressure inlet 556. Positioning the high-pressure inlet 556 along the longitudinal axis 544 can, among other benefits, allow the second end portion 546 of the check valve body 540 to have a relatively small diameter D1. For example, the diameter D1 of the second end portion 546 can be less than 1.75 inches, less than 1.5 inches, less than 1.35 inches, less than 1.2 inches, and/or less than 1 inch. In some embodiments, the diameter D1 of the second end portion 546 is between 0.75-1.75 inches, between 0.8-1.6 inches, between 0.9-1.5 inches, and/or between 1-1.2 inches. Positioning the high-pressure inlet 556 along the longitudinal axis 544 can also allow the fastener hole 560 to be spaced apart from the fluid lines of the check valve body 540, thereby eliminating the need to use a hollow screw or other hollow fastener.

FIG. 6 is an enlarged cross-sectional side view of the check valve assembly 224, configured in accordance with embodiments of the present technology. The low-pressure liquid chamber 218 can be in open fluid communication with the inlet 115 to the liquid pressurization assembly 100 (FIG. 1). In some embodiments, one or more valves are positioned in a fluid path between the inlet 115 and the low-pressure liquid chamber 218. The low-pressure liquid chamber 218 can define an annular or circular chamber that surrounds all or at least a portion of the check valve body 540. For example, in the illustrated embodiment the low-pressure liquid chamber 218 extends around the entire periphery of the elongate portion 548 of the check valve body 540.

The check valve body 540 can include a low-pressure channel 662 in fluid communication with the low-pressure liquid chamber 218. The low-pressure channel 662 can include a radial portion 664 (e.g., a portion perpendicular to the longitudinal axis 544) and an axial portion 666 (e.g., a portion parallel to the longitudinal axis 544) in fluid communication with each other. For example, an inlet to the low-pressure channel 662 can extend radially to the low-pressure liquid chamber 218. This radial portion 664 of the low-pressure channel 662 can connect with the axial portion 666, which extends to the low-pressure outlet 558 on the second end portion 546 of the check valve body 540.

The low-pressure liquid chamber 218 can be sealed on one side (e.g., a side closest to the first end portion 542 of the check valve body 540) by the gasket 654 positioned within the gasket channel 552. The gasket 654 can be, for example, an O-ring or other resilient, elastomeric, or flexible seal that extends completely around the check valve body 540 in the channel 552. The other side of the low-pressure liquid chamber 218 can be sealed by a metal-to-metal seal. More specifically, the flange 550 on the check valve body 540 can include a first seal face 668 (e.g., a first seal surface) configured to engage a corresponding seal face 670 on the endcap 110. The first seal face 668 can be tapered such that a diameter of the first seal face 668 increases in a direction toward the second end portion 546 of the check valve body 540. In some embodiments, the first seal face 668 has a constant taper (e.g., a conical or frustoconical shape). An angle between the first seal face 668/endcap seal face 670 and the longitudinal axis 544 can be between 35°-55° and/or between 40°-50°. In some embodiments, the angle between the first seal face 668/endcap seal face 670 and longitudinal axis 544 is approximately 45°. In other embodiments, the first seal face 668/endcap seal face 670 has a non-constant taper (e.g., a bullet shape, convex shape, or concave shape) when viewed in a plane in which the longitudinal axis 544 lies. In some embodiments, the entire metal-to-metal seal between the check valve body 540 in the endcap 110 is tapered.

In some embodiments, a radially outermost edge 671 of the first seal face 668 is in contact with a radially-outermost edge of the endcap seal face 670 when the check valve assembly 224 is assembled. In some embodiments, this radially outermost edge 671 has a diameter of less than 1.5 inches, less than 1.35 inches, less than 1.2 inches, and/or less than 1 inch. Alignment between the outermost edges of the first seal face 668 and the endcap seal face 670 can reduce the overall diameter of the flange 550 (e.g., the max diameter of the check valve body 540). Reducing the diameter of the check valve body 540 can reduce the cost to manufacture the check valve body 540, as smaller metal stock can be used, and less material is lost while forming the check valve body 540.

The metal-to-metal seal between the first seal face 668 and the endcap seal face 670 can be enabled by compressive force between the endcap 110 and the check valve body 540 when the first endcap 110 is tightened onto the second endcap 112 using the bolts 114 (FIG. 1). The tapered shape of the metal-to-metal seal between the endcap 110 and the check valve body 540 can also help align the check valve body 540 with the endcap 110. For example, engagement between the first seal face 668 and the endcap seal face 670 can reduce or eliminate the risk that the check valve body 540 is tilted or otherwise misaligned with the endcap 110.

Use of a metal-to-metal seal on one side of the low-pressure liquid chamber 218 can also reduce the number of components necessary for the check valve assembly 224 and can simplify manufacture of the check valve body 540. For example, using a metal-to-metal seal eliminates the need to manufacture a second gasket channel on the check valve body 540 or to include a second gasket to seal the low-pressure liquid chamber 218.

With continued reference to FIG. 6, the check valve assembly 224 can include a valve manifold 672 (e.g., a poppet retainer) connected to the second end portion 546 of the check valve body 540. The valve manifold 672 can include a fastener aperture 674 configured to receive a screw 676 or other fastener that extends into the fastener hole 560 and threadably engages the second end portion 546 of the valve body 540 to fixedly attach the valve manifold 672 to the second end portion 546 of the check valve body 540. The spacer ring 228 can overlap a portion of the head of the fastener aperture 674 in a direction perpendicular to the longitudinal axis 544 to inhibit or prevent the screw 676 or other fastener from backing out of the fastener aperture 674 during operation.

The valve manifold 672 can retain a valve poppet 678 between the valve manifold 672 and the low-pressure outlet 558. The poppet 678 can be constructed from an elastomeric, flexible, and/or resilient material or combination of materials. In some embodiments, the poppet 678 is constructed from a metallic material (e.g., stainless steel) and configured to form a metal-to-metal seal with the surface of the second end portion 546 that surrounds the low-pressure outlet 558. In operation, the valve poppet 678 can selectively seal the low-pressure outlet 558. For example, as the plunger 104 compresses liquid within the high-pressure liquid chamber 220, the pressure within the high-pressure liquid chamber 220 can move the valve poppet 678 into contact with the surface of the second end portion 546 that surrounds the low-pressure outlet 558 to seal the low-pressure outlet 558 and prevent high pressure liquid from flowing into the low-pressure channel 662. In some embodiments, the poppet 678 acts as a check valve to reduce or eliminate the risk of high-pressure backflow through the low-pressure channel 662.

The high-pressure liquid chamber 220 can be sealed on one end (i.e., the end closest to the endcap 112) using the seal assembly 230. The high-pressure liquid chamber 220 can be sealed on the other end (e.g. an end closer to the low-pressure liquid chamber 218) by a metal-to-metal seal with the cylinder 222. More specifically, the flange 550 can include a second seal face 680 configured to engage a cylinder seal face 682 to form the metal-to-metal seal. A diameter of the second seal face 680 can increase in the direction toward the first end portion 542 of the check valve body 540. The cylinder seal face 682 can have a size and shape complementary to the second seal face 680. The second seal face 680 can be tapered in a slope opposite to that of the first seal face 668. In some embodiments, the second seal face 680 has a constant taper (e.g., a conical or frustoconical shape). An angle between the second seal face 680/cylinder seal face 682 and the longitudinal axis 544 can be between 35°-55° and/or between 40°-50°. In some embodiments, the angle between the second seal face 680/cylinder seal face 682 and the longitudinal axis 544 is approximately 45°. In other embodiments, the second seal face 680 has a non-constant taper (e.g., a bullet shape, convex shape, or concave shape) when viewed in a plane in which the longitudinal axis 544 lies. In some embodiments, the entire metal-to-metal seal between the check valve body 540 and the cylinder 222 is tapered.

The metal-to-metal seal between the second seal face 680 and the cylinder seal face 680 can be enabled by compressive force between the cylinder 222 and the check valve body 540 when the first endcap 110 is tightened onto the second endcap 112 using the bolts 114 (FIG. 1). The tapered shape of the metal-to-metal seal between the cylinder 222 and the check valve body 540 can also help align the check valve body 540 with the cylinder 222. For example, engagement between the second seal face 680 and the cylinder seal face 682 can reduce or eliminate the risk that the check valve body 540 is tilted or otherwise misaligned with the cylinder 222.

In some embodiments, a radially outermost edge 683 of the second seal face 680 is in contact with a radially-outermost edge of the cylinder seal face 682 when the check valve assembly 224 is assembled. Alignment between the outermost edges of the second seal face 680 and the cylinder seal face 682 can reduce the overall diameter D2 of the flange 550 (e.g., the max diameter of the check valve body 540) in a manner similar to or the same as that described above with respect to the first seal face 668 and the endcap seal face 670. For example, in some embodiments, this radially outermost edge 683 has a diameter of less than 1.5 inches, less than 1.35 inches, less than 1.2 inches, and/or less than 1 inch.

The check valve assembly 224 can be configured to direct high-pressure liquid compressed in the high-pressure liquid chamber 220 through a high-pressure channel 684 in the check valve body 540. The high-pressure channel 684 can extend from the high-pressure inlet 556 to a high-pressure check valve 686. In some embodiments, the high-pressure check valve 686 is positioned at least partially within the outlet fitting 119. The high-pressure check valve 686 can include a valve seal 688 (e.g., a valve seat) and a piston 690 configured to selectively engage the valve seal 688. The valve seal 688 can be a gasket or other structure configured to form a seal with the piston 690 (e.g., a poppet) and the check valve body 540. The valve seal 688 can be constructed from an elastomeric, flexible, and/or resilient material. In some embodiments, the valve seal is constructed from a metal material (e.g., stainless steel). The piston 690 can be biased into contact with the seal 688 by a spring 692 or other biasing member. The piston 690 can be configured to move away from the seal 688 and open a fluid path from high-pressure channel 684 to outlet 117 (FIG. 2) when pressure forces on the piston 690 from the high-pressure fluid overcome the biasing force of the spring 692.

As illustrated, and explained above, the high-pressure channel 684 and/or the high-pressure inlet 556 can lie along the longitudinal axis 544. In some embodiments, the entire high-pressure channel 684 lies along the longitudinal axis 544. In some embodiments, one or more portions of the high-pressure channel 684 (e.g., the high-pressure inlet 556) do not lie along the longitudinal axis 544. For example, while the high-pressure outlet 117 lies on the longitudinal axis 544, the high-pressure channel 684 may include one or more turns, bends, tilted portions (e.g., with respect to the longitudinal axis 544), or other features that put some portion of the high-pressure channel 684 off of the longitudinal axis 544. In one aspect of this embodiment, alignment of the high-pressure outlet 117 with the longitudinal axis 544 favorably eliminates the need to clock the check valve body 540 when assembling the check valve assembly 224. In other words, none of the features of the check valve body 540 rely on rotational orientation or "clocking" relative to the longitudinal axis 544 in order to function properly and/or to mate with adjacent components. Eliminating the need to clock the check valve body 540 reduces assembly costs and/or technical expertise required to assemble the check valve assembly 224, as compared with systems that rely on clocking for proper assembly. Aligning the high-pressure channel 684 along the longitudinal axis 544 can also allow the outlet fitting 119 to lie along the longitudinal axis 544. Positioning the outlet fitting along the longitudinal axis 544 can reduce the required diameter for the first end portion 542 of the check valve body 540 and/or the required overall diameter of the check valve body 540. As explained above, reducing the diameter of the check valve body 540 can reduce material costs associated with manufacturing the check valve body 540. In some embodiments, a ratio between a diameter D2 of the flange 550 (e.g. a maximum diameter of the check valve body 540) to the diameter D3 of the high-pressure channel 684 is less than 20:1, less than 18:1, less than 17:1, less than 16:1, and/or less than 15:1. In some embodiments, the ratio between the diameter D2 of the flange 550 and the diameter D3 of the high-pressure channel 684 is approximately 11.75:1. In other embodiments, the flange 550 may include a radial projection extending from the surface between the first and second seal faces 668, 680 and away from the longitudinal axis 544. This radial projection (not shown) could fill some or all of the space between the cylinder 222 and the endcap 110 in a direction perpendicular to the longitudinal axis 544. The diameter of this radial projection could be, for example, between 2-5 inches, between 3-4 inches, and/or between 3.25-3.75 inches. In some embodiments, the radial projection has a diameter of approximately 3.5 inches.

The check valve body 540 can include a weep port 694 in communication with a weep chamber 696. The weep port 694 and the weep chamber 696 can be configured to allow liquid that leaks pass the valve seal 688 to exit the check valve assembly 224 to ambient. The weep port 694 is positioned along the length of the check valve body 540 between the gasket channel 552 and threads 698 that connect the outlet fitting 119 to the check valve body 540. The weep chamber 696 can entirely or partially surround the valve seal 688.

Some examples of the disclosed technology are further described below.

Example 1. A check valve assembly for use with a liquid jet cutting system, the check valve assembly comprising:
- an annular gasket;
- a check valve body at least partially surrounded by the annular gasket, the check valve body having—;
  - a central axis;
  - a high-pressure fluid inlet on a first end of the check valve body, the high-pressure fluid inlet configured to receive high-pressure fluid from a high-pressure fluid chamber upstream of the high-pressure fluid inlet;
  - a high-pressure outlet on a second end of the check valve body and positioned along the central axis;
  - a high-pressure fluid channel extending through the check valve body between the high-pressure fluid inlet and the high-pressure fluid outlet;
  - a first metallic seal surface on an outer surface of the check valve body between the seal groove and the first end of the check valve body, the first metallic seal surface shaped to engage an endcap of the liquid jet cutting system to form a first seal;
  - an annular low-pressure fluid chamber surrounding a portion of the check valve body and defined at least in part by the annular gasket, the check valve body, the first seal, and the endcap;
  - a low-pressure fluid channel extending through a portion of the check valve body and radially spaced from the high-pressure channel with respect to the central axis, the low-pressure fluid channel fluidly connecting the high-pressure fluid chamber with the low-pressure chamber; and
  - a check valve positioned between the low-pressure fluid channel and the high-pressure fluid chamber.

Example 2. The check valve assembly of example 1, further comprising a second metallic seal surface on the outer surface of the check valve body between the first metallic seal and the first end of the check valve body, the second metallic seal surface shaped to engage a cylinder of the liquid jet cutting system to form a second seal.

Example 3. The check valve assembly of example 1 wherein the check valve body comprises stainless steel.

Example 4. The check valve assembly of example 1 wherein the annular gasket is an O-ring.

Example 5. The check valve assembly of example 1 wherein the low-pressure fluid channel includes a first channel portion extending into the check valve body from the low-pressure chamber in a direction perpendicular to the central axis, and a second channel portion extending from the first channel portion to the high-pressure fluid chamber in a direction parallel to the central axis.

Example 6. The check valve assembly of example 1 wherein the entire high-pressure fluid channel extends along the central axis.

Example 7. The check valve assembly of example 1 wherein the first metallic seal surface has a frustoconical shape and has an angle between 35 degrees and 55 degrees with respect to the central axis.

Example 8. The check valve assembly of example 1 wherein a maximum diameter of the first metallic seal surface is less than 1.5 inches.

Example 9. The check valve assembly of example 1 wherein the high-pressure inlet lies on the central axis.

Example 10. The check valve assembly of example 2 wherein the first metallic seal surface is tapered such that a diameter of the first metallic seal surface increases in a direction away from the low-pressure fluid chamber, and wherein the second metallic seal surface is tapered such that a diameter of the second metallic seal surface decreases in a direction away from the low-pressure fluid chamber.

Example 11. The check valve assembly of example 1, further comprising a check valve screw hole at the first end of the check valve body, the check valve screw hole being radially spaced from the central axis such that at least a portion of the check valve screw hole overlaps a spacer between the high-pressure fluid chamber and the first end of the check valve body in a direction perpendicular to the central axis.

Example 12. The check valve assembly of example 1, further comprising a check valve screw hole at the first end of the check valve body, wherein the check valve screw hole, the high-pressure fluid channel, the central axis, and at least a portion of the low-pressure fluid channel are co-planar.

Example 13. The check valve assembly of example 1, further comprising a seal groove shaped to receive the annular gasket.

Example 14. A check valve body for use with a liquid jet cutting system, the check valve body comprising:
- a first end;
- a longitudinal axis;
- a second end opposite the first end along the longitudinal axis;
- a first body portion between the first end and the second end, the first body portion having a first diameter and extending through an aperture of an endcap of the liquid jet cutting system;
- a circumferential seal groove in an outer surface of the check valve body, the seal groove shaped to retain a mechanical gasket;
- an annular load-bearing portion between the first body portion and the second end, the annular load-bearing portion having a second diameter that is greater than the first diameter, the annular load-bearing portion having an annular metallic seal surface, wherein a diameter of the annular metallic seal surface increases in a direction away from the first end of the check valve body, and wherein the annular metallic seal surface is shaped to contact the endcap to form an annular metal-to-metal seal;
- a high-pressure fluid conduit at least partially defined by the check valve body and disposed along the longitudinal axis, the high-pressure fluid conduit fluidly connecting the first end and the second end and having a third diameter; and
- a low-pressure fluid conduit at least partially defined by the check valve body and radially spaced from the high-pressure fluid conduit with respect to the longitudinal axis, the low-pressure conduit fluidly connecting an interior surface of the aperture of the endcap with the second end of the check valve body,
- wherein a ratio of the second diameter to the third diameter is less than 17:1.

Example 15. The check valve body of example 14 wherein the low-pressure fluid conduit is annular and is defined by the mechanical gasket, the endcap, the check valve body, and the annular metal-to-metal seal.

Example 16. The check valve body of example 14 wherein the annular metallic seal surface is oriented at an angle between 35 degrees and 55 degrees with respect to the longitudinal axis.

Example 17. The check valve body of example 16 wherein the angle is 45 degrees.

Example 18. The check valve body of example 14 wherein the mechanical gasket is an O-ring.

Example 19. The check valve body of example 14 wherein a maximum diameter of the annular metal-to-metal seal is less than 1.5 inches.

Example 20. A check valve assembly for use with a liquid jet cutting system, the check valve assembly comprising:
a check valve body having—
a first end;
a longitudinal axis;
a second end opposite the first end along the longitudinal axis;
an elongate body portion extending along a portion of the check valve body, the elongate body portion having an annular gasket channel extending around a circumference of the elongate body portion and configured to receive an annular mechanical gasket;
a first metallic mating surface extending radially outward from the elongate body between the annular gasket channel and the second end, the first metallic mating surface being tapered such that a diameter of the first metallic mating surface increases toward the second end;
a high-pressure fluid channel extending through the valve body from the first end to the second end;
an annular low-pressure fluid channel surrounding a portion of the elongate body portion between the annular gasket channel and the metallic mating surface; and
a low-pressure fluid channel extending from the annular low-pressure fluid channel to the second end; and
an endcap surrounding a portion of the check valve body including the annular gasket channel and at least a portion of the first metallic mating surface, the endcap having—
an inner annular surface configured to form a seal with the mechanical gasket; and
a second metallic mating surface shaped to mate with the first metallic mating surface to form a metal-to-metal seal,
wherein the entire metal-to-metal seal is tapered such that a diameter of the metal-to-metal seal increases toward the second end of the check valve body.

Example 21. The check valve assembly of example 20 wherein an outermost edge of the metal-to-metal seal is located at an outermost edge of the first metallic mating surface, as measured perpendicular to the longitudinal axis of the check valve body.

Example 22. The check valve assembly of example 21 wherein the outermost edge of the metal-to-metal seal is located at an outermost edge of the second metallic mating surface, as measured perpendicular to the longitudinal axis of the check valve body.

Example 23. The check valve assembly of example 20 wherein an outermost edge of the metal-to-metal seal is at a same distance from the longitudinal axis as a maximum radial width of the check valve body as measured perpendicular to the longitudinal axis of the check valve body.

Example 24. The check valve assembly of example 20 wherein the check valve body further comprises a weep hole positioned between the first end of the check valve body and the annular gasket channel, the weep hole in communication with atmosphere and with a seal in a check valve chamber downstream of the high-pressure fluid channel.

Example 25. The check valve assembly of example 20 wherein an angle between the first metallic mating surface and the longitudinal axis is 45 degrees.

References throughout the foregoing description to features, advantages, or similar language do not imply that all of the features and advantages that may be realized with the present technology should be or are in any single embodiment of the technology. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

As one of ordinary skill in the art will appreciate, embodiments of the check valve assemblies described herein can allow for easier and/or cheaper check valve assembly by reducing or eliminating the need to clock the check valve body during assembly. Additionally, the designs described herein can eliminate the need for second (or third) O-ring seals on the check valve body, thereby reducing the complexity of the design of the check valve body.

The above Detailed Description of examples and embodiments of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes are presented in a given order, alternative implementations may perform routines having steps in a different order, and some processes may be deleted, moved, added, subdivided, combined, and/or modified to provide alternative or sub-combinations. The teachings of the present disclosure provided herein can be applied to other systems, not necessarily the system described above. The elements and acts of the various embodiments described above can be combined to provide further embodiments. All of the patents and applications and other references identified herein, including any that may be listed in accompanying filing papers, are incorporated herein by reference. Aspects of the present disclosure can be modified, if necessary, to employ the systems, functions, and concepts of the various references described above to provide yet further embodiments of the present disclosure.

In general, the terms used in the following claims should not be construed to limit the present disclosure to the specific embodiments disclosed in the specification, unless the above Detailed Description section explicitly defines such terms. Accordingly, the actual scope of the present disclosure encompasses not only the disclosed embodiments, but also all equivalent ways of practicing or implementing the present disclosure.

From the foregoing, it will be appreciated that specific embodiments of the technology have been described herein for purposes of illustration, but that various modifications may be made without deviating from the spirit and scope of the various embodiments of the technology. Further, while various advantages associated with certain embodiments of the technology have been described above in the context of those embodiments, other embodiments may also exhibit such advantages, and not all embodiments need necessarily exhibit such advantages to fall within the scope of the technology. Accordingly, the technology is not limited, except as by the appended claims. Moreover, although certain aspects of the technology are presented below in certain claim forms, the applicant contemplates the various aspects of the technology in any number of claim forms. Accordingly, the applicant reserves the right to pursue additional claims after filing this application to pursue such additional claim forms, in either this application or in a continuing application.

We claim:

1. A check valve assembly for use with a liquid jet cutting system, the check valve assembly comprising:
    a check valve body having—
        a central axis;
        a high-pressure fluid inlet on a first end of the check valve body, the high-pressure fluid inlet configured to receive high-pressure fluid from a high-pressure fluid chamber upstream of the high-pressure fluid inlet;
        a high-pressure fluid outlet on a second end of the check valve body and positioned along the central axis;
        a high-pressure fluid channel extending through the check valve body between the high-pressure fluid inlet and the high-pressure fluid outlet;
        a first metallic seal surface on an outer surface of the check valve body, the first metallic seal surface shaped to engage an endcap of the liquid jet cutting system to form a first seal;
        an annular low-pressure fluid chamber surrounding a portion of the check valve body and defined at least in part by the check valve body, the first seal, and the endcap;
        a low-pressure fluid outlet on the first end of the check valve body; and
        a low-pressure fluid channel extending through a portion of the check valve body between the low-pressure fluid chamber and the low-pressure fluid outlet, the low-pressure fluid channel radially spaced from the high-pressure fluid channel with respect to the central axis and fluidly connecting the high-pressure fluid chamber with the low-pressure fluid chamber;
    a check valve positioned between the low-pressure fluid channel and the high-pressure fluid chamber; and
    a check valve retainer fixedly attached to the first end of the check valve body at a location radially spaced from the high-pressure fluid inlet and the low-pressure fluid outlet with respect to the central axis.

2. The check valve assembly of claim 1, further comprising a second metallic seal surface on the outer surface of the check valve body between the first metallic seal surface and the first end of the check valve body, the second metallic seal surface shaped to engage a cylinder of the liquid jet cutting system to form a second seal.

3. The check valve assembly of claim 2 wherein the first metallic seal surface is tapered such that a diameter of the first metallic seal surface increases in a direction away from the low-pressure fluid chamber, and wherein the second metallic seal surface is tapered such that a diameter of the second metallic seal surface decreases in a direction away from the low-pressure fluid chamber.

4. The check valve assembly of claim 1 wherein the check valve body comprises stainless steel.

5. The check valve assembly of claim 1 wherein the low-pressure fluid channel includes a first channel portion extending into the check valve body from the low-pressure fluid chamber in a direction perpendicular to the central axis, and a second channel portion extending from the first channel portion to the high-pressure fluid chamber in a direction parallel to the central axis.

6. The check valve assembly of claim 1 wherein the entire high-pressure fluid channel extends along the central axis.

7. The check valve assembly of claim 1 wherein the first metallic seal surface has a frustoconical shape and has an angle between 35 degrees and 55 degrees with respect to the central axis.

8. The check valve assembly of claim 1 wherein a maximum diameter of the first metallic seal surface is less than 1.5 inches.

9. The check valve assembly of claim 1 wherein the high-pressure fluid inlet lies on the central axis.

10. The check valve assembly of claim 1, further comprising a check valve screw hole at the first end of the check valve body, the check valve screw hole being radially spaced from the central axis such that at least a portion of the check valve screw hole overlaps a spacer between the high-pressure fluid chamber and the first end of the check valve body in a direction perpendicular to the central axis.

11. The check valve assembly of claim 1, further comprising a check valve screw hole at the first end of the check valve body, wherein the check valve screw hole, the high-pressure fluid channel, the central axis, and at least a portion of the low-pressure fluid channel are co-planar.

12. The check valve assembly of claim 1 wherein the check valve body defines a seal groove shaped to receive an annular gasket, wherein the annular gasket is configured to form a second seal with an inner surface of the endcap.

13. The check valve assembly of claim 12 wherein the annular gasket is an O-ring.

14. The check valve body of claim 12 wherein the first metallic seal surface is on the outer surface of the check valve body between the seal groove and the first end of the check valve body.

15. The check valve assembly of claim 1 wherein the check valve body includes a fastener hole on the first end of the check valve body, and wherein the fastener hole is configured to receive a fastener to fixedly attach the check valve retainer to the first end of the check valve body at the location.

16. The check valve assembly of claim 1 wherein the high-pressure fluid channel is positioned along the central axis.

17. The check valve assembly of claim 1 wherein a center of the high-pressure fluid inlet is positioned on the central axis.

18. The check valve assembly of claim 1 wherein the check valve retainer is configured to retain the check valve at least partially between the check valve retainer and the first end of the check valve body.

19. A check valve body for use with a liquid jet cutting system, the check valve body comprising:
    a first end;
    a longitudinal axis;
    a second end opposite the first end along the longitudinal axis;
    a first body portion between the first end and the second end, the first body portion having a first diameter and configured to extend through an aperture of an endcap of the liquid jet cutting system;
    a circumferential seal groove in an outer surface of the check valve body, the seal groove shaped to retain a mechanical gasket;
    an annular load-bearing portion between the first body portion and the second end, the annular load-bearing portion having a second diameter that is greater than the first diameter, the annular load-bearing portion having an annular metallic seal surface, wherein a diameter of the annular metallic seal surface increases in a direction away from the first end of the check valve body, and wherein the annular metallic seal surface is shaped to contact the endcap to form an annular metal-to-metal seal;

a high-pressure fluid conduit at least partially defined by the check valve body and disposed along the longitudinal axis, the high-pressure fluid conduit fluidly connecting the first end and the second end;

a low-pressure fluid conduit at least partially defined by the check valve body and radially spaced from the high-pressure fluid conduit with respect to the longitudinal axis, the low-pressure fluid conduit fluidly connecting an interior surface of the aperture of the endcap with the second end of the check valve body; and a check valve retainer fixedly attached to the second end of the check valve body at a location radially spaced apart from the high-pressure fluid conduit and the low-pressure fluid conduit.

20. The check valve body of claim 19 wherein the mechanical gasket, the endcap, the first body portion of the check valve body, and the annular metal-to-metal seal define an annular low-pressure fluid chamber fluidly coupled to the low-pressure fluid conduit and extending circumferentially around at least part of the first body portion of the check valve body.

21. The check valve body of claim 19 wherein the annular metallic seal surface is oriented at an angle between 35 degrees and 55 degrees with respect to the longitudinal axis.

22. The check valve body of claim 21 wherein the angle is 45 degrees.

23. The check valve body of claim 19 wherein the mechanical gasket is an O-ring.

24. The check valve body of claim 19 wherein a maximum diameter of the annular metal-to-metal seal is less than 1.5 inches.

25. The check valve body of claim 19 wherein the high-pressure fluid conduit has a third diameter, and wherein a ratio of the second diameter to the third diameter is less than 17:1.

26. The check valve body of claim 19 wherein the longitudinal axis is a central axis of the check valve body.

27. The check valve body of claim 19 wherein the check valve retainer is configured to retain a check valve at least partially between the check valve retainer and the second end of the check valve body.

28. A check valve assembly for use with a liquid jet cutting system, the check valve assembly comprising:
  a check valve body having—
    a first end;
    a longitudinal axis;
    a second end opposite the first end along the longitudinal axis;
    an elongate body portion extending along a portion of the check valve body, the elongate body portion having an annular gasket channel extending around a circumference of the elongate body portion and configured to receive an annular mechanical gasket;
    a first metallic mating surface extending radially outward from the elongate body portion between the annular gasket channel and the second end, the first metallic mating surface being tapered such that a diameter of the first metallic mating surface increases toward the second end;
    a high-pressure fluid channel extending through the check valve body from the first end to the second end;
    an annular low-pressure fluid chamber surrounding a portion of the elongate body portion between the annular gasket channel and the first metallic mating surface;
    a low-pressure fluid channel extending from the annular low-pressure fluid chamber to the second end; and
    a check valve retainer fixedly attached to the second end of the check valve body at a location radially spaced from the high-pressure fluid channel and the low-pressure fluid channel; and
  an endcap surrounding a portion of the check valve body including the annular gasket channel and at least a portion of the first metallic mating surface, the endcap having—
    an inner annular surface configured to form a seal with the mechanical gasket; and
    a second metallic mating surface shaped to mate with the first metallic mating surface to form a metal-to-metal seal,
  wherein the entire metal-to-metal seal is tapered such that a diameter of the metal-to-metal seal increases toward the second end of the check valve body.

29. The check valve assembly of claim 28 wherein an outermost edge of the metal-to-metal seal is located at an outermost edge of the first metallic mating surface, as measured perpendicular to the longitudinal axis of the check valve body.

30. The check valve assembly of claim 29 wherein the outermost edge of the metal-to-metal seal is located at an outermost edge of the second metallic mating surface, as measured perpendicular to the longitudinal axis of the check valve body.

31. The check valve assembly of claim 28 wherein an outermost edge of the metal-to-metal seal is at a same distance from the longitudinal axis as a maximum radial width of the check valve body as measured perpendicular to the longitudinal axis of the check valve body.

32. The check valve assembly of claim 28 wherein the check valve body further comprises a weep hole positioned between the first end of the check valve body and the annular gasket channel, the weep hole in communication with atmosphere and with a seal in a check valve chamber downstream of the high-pressure fluid channel.

33. The check valve assembly of claim 28 wherein an angle between the first metallic mating surface and the longitudinal axis is 45 degrees.

34. The check valve assembly of claim 28 wherein the check valve retainer is configured to retain a check valve at least partially between the check valve retainer and the second end of the check valve body.

35. A check valve assembly for use with a liquid jet cutting system, the check valve assembly comprising:
  a check valve body, having—
    a central axis;
    a high-pressure fluid inlet on a first end of the check valve body, the high-pressure fluid inlet configured to receive high-pressure fluid from a high-pressure fluid chamber upstream of the high-pressure fluid inlet;
    a high-pressure fluid outlet on a second end of the check valve body and positioned along the central axis;

a high-pressure fluid channel extending through the check valve body between the high-pressure fluid inlet and the high-pressure fluid outlet;

a first metallic seal surface on an outer surface of the check valve body, the first metallic seal surface shaped to engage an endcap of the liquid jet cutting system to form a first seal;

an annular low-pressure fluid chamber surrounding a portion of the check valve body and defined at least in part by the check valve body, the first seal, and the endcap;

a low-pressure fluid outlet on the first end of the check valve body; and a low-pressure fluid channel extending through a portion of the check valve body between the low-pressure fluid chamber and the low-pressure fluid outlet, the low-pressure fluid channel radially spaced from the high-pressure fluid channel with respect to the central axis and fluidly connecting the high-pressure fluid chamber with the low-pressure fluid chamber;

a check valve positioned between the low-pressure fluid channel and the high-pressure fluid chamber; and a check valve retainer fixedly attached to the first end of the check valve body at a location radially spaced from the high-pressure fluid inlet with respect to the central axis, wherein the low-pressure fluid outlet is positioned opposite, with respect to the central axis, the location at which the check valve retainer is fixedly attached to the first end of the check valve body.

36. The check valve assembly of claim 35 wherein the check valve retainer is configured to retain the check valve at least partially between the check valve retainer and the first end of the check valve body.

37. The check valve assembly of claim 35, further comprising a second metallic seal surface on the outer surface of the check valve body between the first metallic seal surface and the first end of the check valve body, the second metallic seal surface shaped to engage a cylinder of the liquid jet cutting system to form a second seal.

38. A check valve assembly for use with a liquid jet cutting system, the check valve assembly comprising:

a check valve body, having— a central axis;

a high-pressure fluid inlet on a first end of the check valve body, the high-pressure fluid inlet configured to receive high-pressure fluid from a high-pressure fluid chamber upstream of the high-pressure fluid inlet;

a high-pressure fluid outlet on a second end of the check valve body and positioned along the central axis;

a high-pressure fluid channel extending through the check valve body between the high-pressure fluid inlet and the high-pressure fluid outlet;

a first metallic seal surface on an outer surface of the check valve body, the first metallic seal surface shaped to engage an endcap of the liquid jet cutting system to form a first seal;

an annular low-pressure fluid chamber surrounding a portion of the check valve body and defined at least in part by the check valve body, the first seal, and the endcap;

a low-pressure fluid outlet on the first end of the check valve body; and a low-pressure fluid channel extending through a portion of the check valve body between the low-pressure fluid chamber and the low-pressure fluid outlet, the low-pressure fluid channel radially spaced from the high-pressure fluid channel with respect to the central axis and fluidly connecting the high-pressure fluid chamber with the low-pressure fluid chamber;

a check valve positioned between the low-pressure fluid channel and the high-pressure fluid chamber; and a check valve retainer fixedly attached to the first end of the check valve body at a location radially spaced from the high-pressure fluid inlet with respect to the central axis, wherein the check valve body includes a fastener hole on the first end of the check valve body, wherein the fastener hole is configured to receive a fastener to fixedly attach the check valve retainer to the first end of the check valve body, and wherein the fastener hole is spaced radially apart from the high-pressure fluid inlet and the low-pressure fluid outlet.

39. The check valve assembly of claim 38 wherein the check valve retainer is configured to retain the check valve at least partially between the check valve retainer and the first end of the check valve body.

40. The check valve assembly of claim 38 wherein the low-pressure fluid channel includes a first channel portion extending into the check valve body from the low-pressure fluid chamber in a direction perpendicular to the central axis, and a second channel portion extending from the first channel portion to the high-pressure fluid chamber in a direction parallel to the central axis.

* * * * *